United States Patent [19]

Weber et al.

[11] Patent Number: 4,686,794
[45] Date of Patent: Aug. 18, 1987

[54] STONE GUIDE FOR A SUPERFINISHING MACHINE

[75] Inventors: Robert Weber, Zeil; Anton Memmel, Aidhauser, both of Fed. Rep. of Germany

[73] Assignee: Supfina Maschinenfabrik Hentzen GmbH & Co., Fed. Rep. of Germany

[21] Appl. No.: 720,436

[22] Filed: Apr. 5, 1985

[30] Foreign Application Priority Data

May 5, 1984 [DE] Fed. Rep. of Germany ....... 3412751

[51] Int. Cl.4 .............................................. B24B 33/04
[52] U.S. Cl. ........................................ 51/59 R; 51/66; 409/233; 403/381; 403/373; 92/165 PR; 92/178
[58] Field of Search ............... 51/57, 58, 59 R, 59 SS, 51/60, 66, 67, 331, 156, 161; 29/568; 82/36 R, 36 B; 92/33, 165 PR, 178; 403/373, 381; 409/233

[56] References Cited

U.S. PATENT DOCUMENTS

| 2,238,646 | 4/1941 | Indge | 51/59 R |
| 3,654,737 | 4/1972 | Schmidt | 51/66 |
| 3,807,011 | 4/1974 | Harman et al. | 29/568 |
| 4,055,095 | 10/1977 | Gramespacher et al. | 29/568 |
| 4,084,462 | 4/1978 | Grinage | 409/233 X |
| 4,480,529 | 11/1984 | Winkler et al. | 92/165 PR X |

FOREIGN PATENT DOCUMENTS

| 2516134 | 10/1976 | Fed. Rep. of Germany | 92/33 |
| 267749 | 4/1950 | Switzerland | 51/59 R |

Primary Examiner—Robert P. Olszewski
Attorney, Agent, or Firm—Jones, Tullar & Cooper

[57] ABSTRACT

A stone guide for guiding the honing stone of a superfinishing machine. The stone guide receives a honing stone unit which comprises a honing stone and a honing stone holder. The honing stone holder defines a shoulder and a contact surface. The stone guide includes a piston and a piston rod, at one end of which there is disposed a contact surface, and a rapid-clamping device displaceable in the piston rod. The rapid-clamping device includes a further piston, a further piston rod connected to the further piston and a clamping element which defines a shoulder. Both pistons are displaceable by means of a pressure medium such that displacement of the piston effects lowering of the honing stone unit unto a workpiece and the upward movement of the further piston effects engagement of the contact surfaces.

8 Claims, 4 Drawing Figures

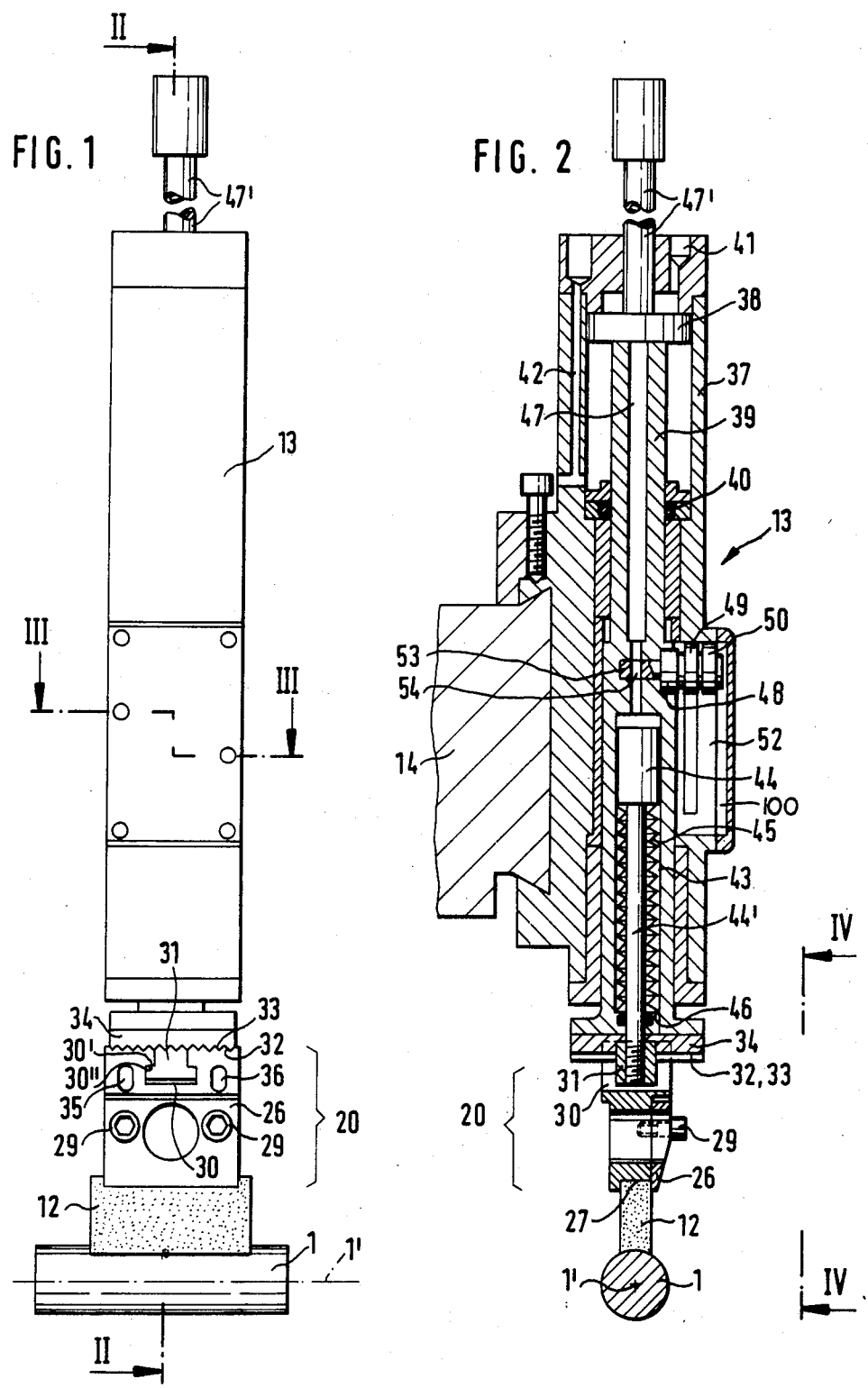

STONE GUIDE FOR A SUPERFINISHING MACHINE

FIELD OF THE INVENTION

The invention relates to a stone guide for a superfinishing machine, intended for receiving a honing stone unit comprising a stone holder and a honing stone received in the holder. For lowering the honing stone unit onto a workpiece, the guide has a piston which is displaceable in a housing and actuatable by a medium that is under pressure.

BACKGROUND OF THE INVENTION

As a general rule, superfinishing machines of the type noted are designed such that a workpiece is centerlessly received between two rollers rotating in the same direction. The rollers are somewhat obliquely positioned with respect to one another, in terms of their longitudinal axes, so that they impart to the workpiece not only a rotational movement but also, at the same time, a feeding movement in the direction of its longitudinal axis, along the gap between the rollers. While the workpieces are being rotated and moved along in the feeding direction by the rollers, honing stones are seated on the workpieces. The honing stones are made to vibrate parallel to the axial direction of the workpieces by a vibrating mechanism. As a result, the roundness and surface finish of the workpieces are improved.

In order to eliminate the out-of-roundness and roughness of the workpieces still present after preliminary machining, which is generally a grinding operation, a certain amount of workpiece material must first be removed. Only then is the finish improved by reducing the peak-to-valley height of the surface. Furthermore, a high machining or throughput speed and short machine idle periods are desirable. For these reasons, a plurality of honing stones of varying coarseness or fineness are disposed in succession in the feed direction above the gap between the rollers. The first honing stones beneath which the workpiece travels are relatively coarse. They remove a relatively large amount of material in order to improve the roundness. Subsequently, the workpiece travels along beneath finer honing stones; these stones remove less material and effect a substantial improvement in the finish, until the peak-to-valley height is extremely low.

The honing stones must be changed relatively frequently, because they cannot be arbitrarily long, since as very high stones, they tend to vibrate, and since they cannot be fabricated with a uniform structure. The operation of changing the stones, which involves the removal of the worn honing stones and the mounting of new, unworn stones, takes a relatively long time. The changing operation must be performed relatively frequently, on account of the varying structure of the stones and the different tasks to which they are put, causing them to wear down at varying rates. The idle periods of the machine increase in cases where one operator monitors several machines. Also, under the conditions of restricted space prevailing in a superfinishing machine of this kind mistakes occur. For example, it is difficult to prevent one type of stone being mistaken for another, or for incorrectly securing the stones.

OBJECT AND SUMMARY OF THE INVENTION

It is accordingly an object of the present invention to provide a stone holder which enables rapid changing of the honing stones, or of the honing stone unit embodied by a honing stone and a stone holder. The stone guide should also be functionally so simple that it is suited for integration with other devices on a superfinishing machine in order to enable automatic changing of the honing stone unit.

This object is attained in accordance with the invention by a stone guide having a piston and a rapid clamping device. The clamping device is embodied by a further piston and piston rod, also actuatable by a medium under pressure, the clamping device being displaceable in a piston rod joined with the piston. The lower end of the clamping device is provided with a clamping element which has a shoulder, which upon an upward movement of the further piston acts counter to a shoulder in the honing stone unit and thereby presses a contact face of the honing stone unit against a contact face on the stone guide.

Thus a particularly simple stone guide, suited for rapid changing of the honing stone unit, is provided. The rapid-clamping device can be tightened or untightened or loosened, quickly. In tightening, the honing stone unit is pulled tightly into a precisely defined position and retained there. During untightening or loosening of the rapid-clamping device, the honing stone unit can readily be removed. This can also be effected automatically by means of the gripper of a transfer device provided on a transporting apparatus, in that the fingers of a gripper engage passages in the honing stone unit and, when moving backward, remove the honing stone unit from the stone holder. Exact positioning of the honing stone unit is preferably attained in that the upper surface of the stone holder and the lower surface, or stop plate, on the stone guide are provided with teeth, or toothed surfaces, which are adapted to one another.

An exemplary embodiment of the invention and further advantageous developments thereof are described in greater detail below, in conjunction with the drawings.

BRIEF DESCRIPTION OF THE DRAWINGS

FIG. 1 is a front view in elevation illustrating a stone guide and stone holder according to the invention;

FIG. 2 is a section taken along the line II—II of FIG. 1;

DESCRIPTION OF THE PREFERRED EMBODIMENT

Figure 3:
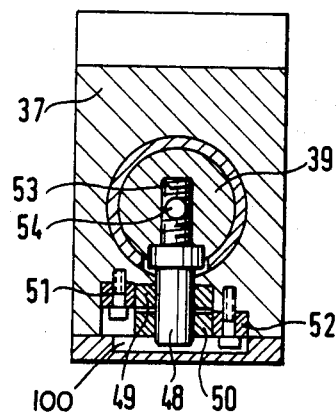
FIG. 3 is a section taken along the line III—III of FIG. 1.

A honing stone 12 is received in a stone holder 20 and with it embodies a honing stone unit, which is received by a stone guide 13.

The stone guide 13 is secured to a prism 14 by means of a dovetail guide. The prism 14 is part of a vibration head, which represents the actual vibration drive of the honing stones and imparts to them a vibrating movement parallel to the longitudinal axis 1' of a cylindrical workpiece 1.

As shown in FIG. 2, the stoneholder 20 has a recess 27 for the honing stone 12, in which the honing stone 12 is clamped by means of a clamping plate 26 and screws 29.

Figure 4:
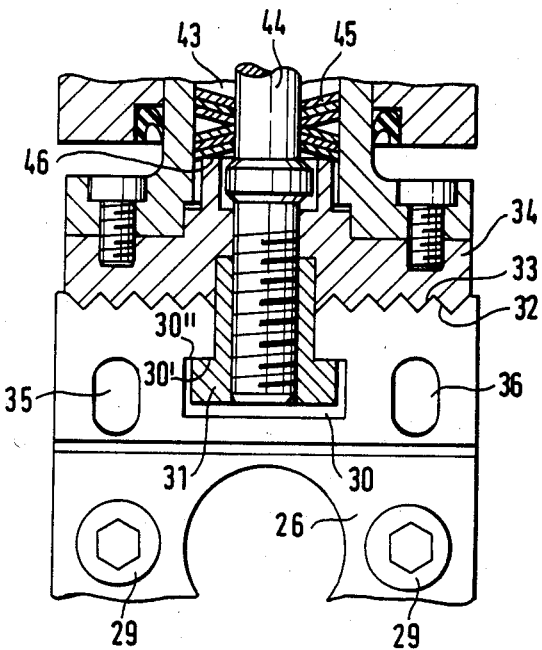
FIG. 4 is a view in the direction of the line IV—IV of FIG. 2.

On its top, the stone holder 20 has a groove 30. The cross section of the groove 30 takes the form of an inverted T (see FIG. 4). A clamping element 31, which is part of the stone guide 13, engages the groove 30 and likewise has the form of an inverted T. If the clamping element 31, which is part of a rapid-clamping device of the stone guide 13, is tightened upward, then the shoulder 30' of the groove 30 is pressed against the shoulder 30" of the clamping element 31, and thus the stone holder 20 along with the honing stone 12 is pulled upward. If the clamping element 31 is lowered slightly, then the stone holder 20, along with the honing stone 12, can then be pulled away from the clamping element 31 in the longitudinal direction of the groove 30 and thus removed from the stone guide 13. This direction is the insertion direction, along which a honing stone unit can also be inserted into the stone guide 13. The top of the stone holder 20 has a toothed surface 32. A corresponding toothed surface 33 is provided on the underside of a stop plate 34 of the piston rod 39 of the stone guide 13. These two toothed surfaces 32, 33 embody contact surfaces; that is, they are pressed against one another as the clamping element 31 moves upward. It is thereby assured that the stone holder 20 along with the honing stone 12 is always drawn into a precisely defined position with respect to the stone guide 13. In the position shown, the stone holder 20 rests on the toothed surface 33.

The stone holder 20 has two further passages 35, 36, which extend parallel to the groove 30. During changes of the honing stones, fingers of the stone changing apparatus extend into these passages.

The stone guide 13 is designed in such a manner (see FIGS. 1, 2) that a first piston 38 is displaceable inside a housing 37. The piston 38 is integrally embodied with an elongated tubular piston rod 39, which is displaced along with the piston 38 and is sealed off from the housing 37 by means of a seal 40. The top of the piston 38 can be subjected to compressed air via a line 41 and the bottom of the piston 38 can be subjected to compressed air via a line 42. In this manner, the piston 38 can be moved upward or downward, in order to lower the honing stone unit 12, 20 onto the workpiece 1 (working or machining position) or raise it away therefrom (changing position, as in FIGS. 1, 2).

The piston rod 39 is provided with a bore 43, in which a second piston 44 is displaceably disposed. The clamping element 31 is attached to the bottom of its piston rod 44'. The piston 44 and clamping element 31 together embody the rapid-clamping device. The piston 44 is pressed upward inside the bore 43 by springs 45 which are supported on a shoulder 46 at the lower end of the bore 43. A downward movement of the piston 44 is effected whenever its top is acted upon by a medium that is under pressure. This is accomplished via lines 47 and 47'. The stop plate 34 already mentioned above, having the toothed surface 33, is attached to the bottom of the tube 39. If the piston 44 moves downward, then the toothed surfaces 32 (on the stone holder 20) and 33 (on the stop plate 34) separate, so that the honing stone unit 12, 20 can be pulled away from the clamping element 31 in the insertion direction, that is, in the direction of the groove 30.

A shaft 48 (FIG. 3) on which two roller bearings 49 and 50 are secured serves as a rotational fixing means for piston rod 39. The roller bearing 49 travels on a rail 51, and the roller bearing 50 travels on a rail 52. Both are adjusted into position without play. This assures satisfactory rotational fixation. The shaft 48 is screwed into the piston rod 39. The threaded tang 53, which is integrally embodied with the shaft 48, has a bore 54 through which the line 47 extends.

The housing 37 is provided with a slot 100. This slot 100 extends vertically and can be identified in FIG. 2 by that portion of the housing, which is not hatched. Thus, shaft 48, which is fixed in piston rod 39 (see FIG. 3), can reciprocate up and down in the housing 37, while rollers 49, 50 attached to shaft 48 move along the vertically extending rails 51 and 52, which are also attached to the housing.

What is claimed:

1. A stone guide for a superfinishing machine for superfinishing the outer cylindrical surface of a workpiece rotatable about its axis, the superfinishing machine including a supporting member vibrating parallel to the outer cylindrical surface of the workpiece, the stone guide comprising:
    a housing mounted to the supporting member;
    a first piston movable within said housing in a direction normal to the axis of the workpiece;
    an elongated tubular member connected to said first piston for movement within said housing, said elongated tubular member defining a cylindrical bore;
    means connected to said elongated tubular member and defining a contact surface;
    a second piston movable within said cylindrical bore;
    a clamping element connected to said second piston, said clamping element defining a first shoulder;
    a honing stone;
    honing stone holding means for holding the honing stone, said honing stone holding means defining a contact surface and a second shoulder;
    first pressure means for pressing said first shoulder against said second shoulder to clamp the honing stone holding means in a fixed relation with said first piston;
    second pressure means for supplying a pressurized medium to said second piston to act against said first pressure means from its connection to said first piston by said clamping element; and
    third pressure means for supplying a pressurized medium to said first piston to press the unit comprising the first piston, the second piston, the honing stone holding means and the honing stone against the outer cylindrical surface of the workpiece.

2. The stone guide as defined in claim 1, wherein:
    the honing stone holding means defines a groove, open at one end, within which said second shoulder is defined; and
    the clamping element is received within said groove, the cross-section of said groove and said clamping element both having the form of an inverted T.

3. The stone guide as defined in claim 2, further wherein:
    the honing stone holding means further defines a pair of passages which extend in the same direction as said groove.

4. The stone guide as defined in claim 1, further wherein:
    said first pressure means biases said second piston away from the honing stone.

5. The stone guide as defined in claim 1, further wherein:

both contact surfaces are embodied as toothed surfaces which fit into one another.

6. The stone guide as defined in claim 5, further wherein:
   the stone guide and said unit define a longitudinal axis; and
   the contact surfaces of the teeth of said toothed surfaces extend at right angles to said longitudinal axis.

7. The stone guide as defined in claim 1, further comprising:
   a shaft mounted to said elongated tubular member and extending at right angles to the direction of displacement of said elongated tubular member;
   a pair of rails situated within said housing; and
   a pair or roller bearings mounted to said shaft, said roller bearings traveling on a respective one of said rails.

8. The stone guide as defined in claim 1, further wherein:
   said first piston is actuated pneumatically and said second piston is actuated hydraulically.

* * * * *